US012587382B2

(12) United States Patent
Chabanne et al.

(10) Patent No.: US 12,587,382 B2
(45) Date of Patent: Mar. 24, 2026

(54) METHOD AND SYSTEM FOR PROCESSING BIOMETRIC DATA

(71) Applicant: Idemia Identity & Security France, Courbevoie (FR)

(72) Inventors: Hervé Chabanne, Courbevoie (FR); Vincent Despiegel, Courbevoie (FR)

(73) Assignee: IDEMIA IDENTITY & SECURITY FRANCE, Courbevoie (FR)

( * ) Notice: Subject to any disclaimer, the term of this patent is extended or adjusted under 35 U.S.C. 154(b) by 286 days.

(21) Appl. No.: 17/663,766

(22) Filed: May 17, 2022

(65) Prior Publication Data

US 2022/0376918 A1     Nov. 24, 2022

(51) Int. Cl.
| | |
|---|---|
| *G06F 21/00* | (2013.01) |
| *G06F 21/62* | (2013.01) |
| *H04L 9/30* | (2006.01) |
| *H04L 9/32* | (2006.01) |

(52) U.S. Cl.
CPC ........ *H04L 9/3231* (2013.01); *G06F 21/6245* (2013.01); *H04L 9/30* (2013.01)

(58) Field of Classification Search
CPC ......... H04L 9/3231; H04L 9/30; H04L 9/008; H04L 9/0866; G06F 21/6245
See application file for complete search history.

(56) References Cited

U.S. PATENT DOCUMENTS

| | | | |
|---|---|---|---|
| 2016/0072801 A1* | 3/2016 | Cao ........................ | H04L 9/0866 713/186 |
| 2018/0349577 A1* | 12/2018 | Goldwasser .......... | H04L 9/3073 |

| | | | |
|---|---|---|---|
| 2019/0299932 A1* | 10/2019 | Porteret ............. | G07C 9/00563 |
| 2019/0370441 A1* | 12/2019 | Eldefrawy ........... | H04L 9/3231 |
| 2022/0335157 A1* | 10/2022 | Chabanne ........... | G06F 21/6245 |

OTHER PUBLICATIONS

Ambrona Miguel et al: "Controlled Functional Encryption Revisited: Multi-Authority Extensions and Efficient Schemes for Quadratic Functions", Proceedings on Privacy Enhancing Technologies, vol. 2021, No. 1, Nov. 9, 2020 (Nov. 9, 2020), pp. 21-42, XP055868271, DOI: 10.2478/popets-2021-0003.

Sam Kim et al: "Function-Hiding Inner Product Encryption is Practical", IACR, International Association for Cryptologic Research vol. 20180613:204744 Jun. 13, 2018 (Jun. 13, 2018), pp. 1-34, XP061025709, Extrait de l'Internet: URL:http://eprint.iacr.org/2016/440.pdf.

Jeon Seong-Yun et al: "Acceleration of Inner-Pairing Product Operation for Secure Biometric Verification", Sensors, vol. 21, No. 8, Apr. 19, 2021 (Apr. 19, 2021) , p. 2859, XP055886848, DOI: 10.3390/s21082859.

(Continued)

*Primary Examiner* — Jeffrey C Pwu
*Assistant Examiner* — Helai Salehi
(74) *Attorney, Agent, or Firm* — WOMBLE BOND DICKINSON (US) LLP

(57) ABSTRACT

The invention proposes a method for processing personal data, having the steps of (a) Functional encryption of candidate personal data using a functional encryption public key, (b) For at least one reference personal data, functional decryption of the encrypted candidate biometric data using a functional decryption private key for the polynomial function of degree 1 or 2 parameterized with said reference personal data.

14 Claims, 2 Drawing Sheets

(56)                    References Cited

OTHER PUBLICATIONS

Michel Abdalla et al: "Inner-Product Functional Encryption with Fine-Grained Access Control", IACR, International Association for Cryptologic Research vol. 20200518:070654 May 16, 2020 (May 16, 2020), pp. 1-48, XP061035862, Extrait de l'Internet: URL:http://eprint.iacr.org/2020/577.pdf.

Zhou Kai et al: "ExpSOS: Secure and Verifiable Outsourcing of Exponentiation Operations for Mobile Cloud Computing", IEEE Transactions on Information Forensics and Security, IEEE, USA, vol. 12, No. 11, Nov. 1, 2017 (Nov. 1, 2017), pp. 2518-2531, XP011660590, ISSN: 1556-6013, DOI: 10.1109/TIFS.2017.2710941.

* cited by examiner

METHOD AND SYSTEM FOR PROCESSING BIOMETRIC DATA

CROSS-REFERENCE TO RELATED APPLICATIONS

This application claims priority pursuant to 35 U.S.C. 119(a) to France Patent Application No. 2105268, filed May 20, 2021, which application is incorporated herein by reference in its entirety.

TECHNICAL FIELD OF THE INVENTION

The invention relates to a method for processing personal data, for the comparison between one candidate personal data and at least one reference personal data.

STATE OF THE ART

Identification or authentication schemes are already known wherein a user presents to a trusted processing unit, for example a unit belonging to a customs office, an airport, etc., newly acquired biometric data on the user that the unit matches with one or more reference biometric data stored in a database to which it has access.

This database aggregates the reference biometric data of authorized individuals (such as passengers on a flight before boarding).

Such a solution is satisfactory, but raises the problem of the confidentiality of the reference biometric database in order to guarantee user privacy. It is therefore mandatory to encrypt this database.

To avoid any unencrypted manipulation of the biometric data, it is possible to use a homomorphic encryption and to implement the processing operations on the biometric data (typically distance calculations) in the encrypted domain. A homomorphic cryptographic system makes it possible to carry out certain mathematical operations on previously encrypted data instead of unencrypted data. Thus, for a given calculation, it becomes possible to encrypt the data, carry out certain calculations associated with said given calculation on the encrypted data, and decrypt them, obtaining the same result as if said given calculation had been carried out directly on the unencrypted data.

Thus the custodian of the private key of the homomorphic cryptographic system can then obtain the desired result of identification or authentication of an individual.

However, even if this custodian is a trusted entity, they have the ability to decrypt the biometric data with this key, which remains problematic.

Additionally, the custodian can carry out mathematical operations on the previously encrypted data, other than those to which the users who have submitted their biometric data have consented.

It would thus be desirable to have a simple, reliable, secure and fully privacy-compliant solution for identifying/authenticating an individual.

SUMMARY

According to a first aspect, the invention relates to a method for processing personal data, characterized in that it comprises the implementation by a system of steps of:
 (a) Functional encryption of candidate personal data using a functional encryption public key;
 (b) For at least one reference personal data, functional decryption of the candidate encrypted biometric data using a functional decryption private key for a polynomial function of degree 1 or 2 parameterized with said reference personal data.

According to advantageous and non-limitative characteristics:

Said polynomial function of degree 1 or 2 parameterized with said reference personal data is a distance function with said reference personal data.

The method comprises a step (a0) of generating said functional decryption private key for said polynomial function of degree 1 or 2 parameterized with said reference personal data, from a master key and from said reference personal data.

Said functional decryption private key for the distance function with said reference personal data is generated by applying said distance function between said master key and said reference personal data.

Step (a0) comprises the generation of said functional encryption public key from said master key.

Step (a0) comprises the generation of said master key; obtaining at least one reference personal data; and, for each reference personal data obtained, the generation of the functional decryption private key for said polynomial function of degree 1 or 2 parameterized with said reference personal data, so as to establish a base of functional decryption private keys.

Said personal data is biometric data, wherein step (a) comprises obtaining said candidate biometric data from a biometric trait using biometric acquisition means of the system.

Said functional encryption public key is entrusted to an authority controlling the implementation of step (a).

Said system comprises a hardware security module, with the authority making the functional encryption public key available to the hardware security module in order to implement step (a).

Step (a0) comprises storing said functional encryption public key in a hardware security module of the authority for implementing step (a).

Said system comprises a hardware security module storing said functional decryption private key for the polynomial function of degree 1 or 2 parameterized with said reference personal data and implementing step (b).

Step (a0) comprises storing said base of functional decryption private keys in said hardware security module, in particular by instantiating a binary with said functional decryption private keys.

Said system comprises a data processing module implementing step (a), with the candidate encrypted biometric data item being transmitted to the hardware security module.

Said system comprises a hardware security module (10), step (b) further comprising the processing by said hardware security module (10) of the result of the polynomial function so as to obtain another piece of data representative of the result of a comparison between the candidate personal data and the reference personal data.

Said hardware security module is an enclave of the data processing module, such as an SGX enclave.

According to a second aspect, the invention proposes a biometric data processing system, characterized in that it is configured for the implementation of steps of:
 (a) Functional encryption of candidate personal data using a functional encryption public key;
 (b) For at least one reference personal data, functional decryption of the candidate encrypted biometric data using a functional decryption private key for a polynomial function of degree 1 or 2 parameterized with said reference personal data.

According to a third and a fourth aspect, the invention proposes a computer program product comprising code instructions for the execution of a method according to the first aspect of processing biometric data; and a storage means readable by computer equipment on which a computer program product comprises code instructions for carrying out a method according to the first aspect of processing biometric data.

BRIEF DESCRIPTION OF THE FIGURES

Other characteristics, aims and advantages of the present invention will become apparent on reading the detailed description that follows, with regard to the annexed figures, given by way of non-limiting examples and wherein.

DETAILED DESCRIPTION

Architecture

Figure 1:
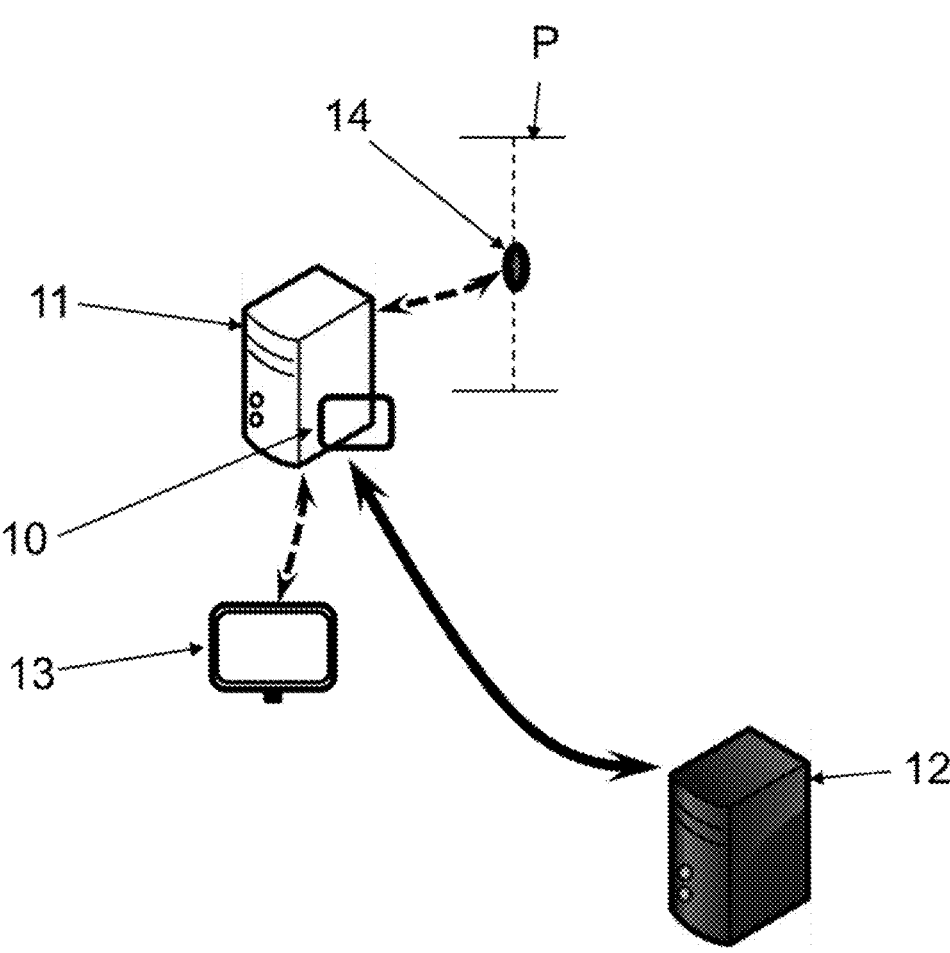
FIG. 1 schematically represents a preferred embodiment of a system for implementing a method according to the invention.

With reference to FIG. 1, a system 1 for processing personal data for the implementation of a method for processing personal data for the authentication/identification of individuals is schematically represented.

This system 1 is a piece of equipment owned and controlled by an entity with which the authentication/identification must be carried out, for example a government entity, customs, an organization, etc. In the rest of the present description, the example of an airport will be taken, with the system 1 typically aiming to control the access of passengers on a flight before boarding.

By personal data, biometric data is meant in particular (and this example will be used in the rest of the present description), but it will be understood that this may be any data specific to an individual on the basis of which it is possible to authenticate a user, such as alphanumeric data, a signature, etc.

Conventionally, the system 1 comprises a data processing module 11, i.e. a computer such as for example a processor, a microprocessor, a controller, a microcontroller, an FPGA, etc. This computer is suitable for executing code instructions to carry out, if necessary, part of the data processing that will be presented below.

The system 1 also comprises a data storage module 12 (a memory, for example flash) and advantageously a user interface 13 (typically a screen), and biometric acquisition means 14 (see below).

In addition, the system 1 advantageously comprises at least one hardware security module 10 or simply HSM (in French the name "Boîte noire transactionnelle" or BNT is also used). It is an apparatus considered tamper-proof offering cryptographic functions, which can be for example a PCI plug-in electronic card on a computer or an external SCSI/IP box, but also a secure enclave of the data processing module 11. The hardware security module 10 may be controlled by an authority, see below.

The system 1 may be provided locally (for example in the airport), but can be separated into one or even more remote servers hosting the electronic components (modules 10, 11, 12) connected to the biometric acquisition means 14 that must necessarily remain on site (at the gate for boarding control). In the example of FIG. 1, storage module 12 is remote.

In the preferred biometric embodiment, the system 1 is capable of generating so-called candidate biometric data from a biometric trait of an individual. The biometric trait can for example be in the form of the face, or one or more irises of the individual. The extraction of the biometric data is achieved by processing the image of the biometric trait, which depends on the nature of the biometric trait. Methods for processing a variety of images in order to extract biometric data are known to the person skilled in the art. By way of non limiting example, the extraction of the biometric data can comprise an extraction of particular points or of a shape of the face in the case where the image is that of the individual's face.

The biometric acquisition means 14 therefore typically consist of an image sensor, for example a digital still apparatus or a digital camera, suitable for acquiring at least one image of a biometric trait of an individual, see below.

Typically, there will always be one candidate personal data and at least one reference personal data to compare, if alphanumeric personal data is used the candidate data can be simply entered on the means 13 or for example obtained by optical reading from an image.

If data storage module 12 generally stores a reference personal database, i.e. at least one personal data "expected" from an authorized individual, for example passengers registered for the flight, as will be seen this is not necessarily the case in the present invention, and it will be possible to be satisfied with a database of private decryption keys each associated with a reference personal data (and from which it is constructed—it is not necessary to keep the reference biometric data afterwards), but it does not allow tracing back to this reference personal data. This is also very advantageous in terms of data storage size.

In all cases, each reference personal data is advantageously a piece of data recorded in an identity document of the individual. For example, the personal data may be the biometric data obtained from an image of the face appearing on an identity document (for example a passport), or even an image of the face or at least one iris of the individual recorded in a radio frequency chip contained in the document.

As will be seen, the invention is distinguished in that said private decryption keys, and typically all the cryptographic keys that will be used, are those of a so-called functional asymmetric cryptosystem (FE, Functional Encryption). There is a pair of a set of functional decryption private keys (one for each reference biometric data) preferentially stored in the hardware security module 10 or else the database of the storage module 12, and a public encryption key. Functional encryption is a generalization of asymmetric encryption wherein the use of the private decryption key on an encrypted data makes it possible not to find the original data, but the result of the application of a given function to said original data, in particular a polynomial function of degree 1 or 2, preferentially a distance function, and in particular at least one scalar product as will be seen below, i.e. functional encryption of type IPFE (inner-product functional encryption). It is understood that the functional encryption "restricts" the result of the decryption since it is no longer possible to trace back to the original data, which will be cleverly used in the present invention.

In mathematical terms, if we denote $c \leftarrow Enc\,(p_k, x)$ as the encryption of data x with the functional encryption public key $p_k$, and $y \leftarrow Dec\,(s_k(f), c)$ as the decryption of the cipher c with the functional encryption private key $s_k(f)$ for the function $f$ (here a scalar product), then $y=f(x)$.

Those skilled in the art will also be able to implement any known technique to provide additional security properties, for example by hiding the entries.

In one embodiment, the system 1 carries out an authentication of the individual, that is compares the so-called candidate personal data (newly acquired from the individual in the case of biometric data, or otherwise simply requested from the individual if it is alphanumeric data for example), to a single reference personal data, supposed to come from the same individual, in order to verify that the individual from which the two data were obtained is indeed the same.

In another embodiment, the system 1 carries out identification of the individual, that is compares the candidate personal data with all the reference personal data of said database, in order to determine the identity of the individual.

The system 1 can finally comprise access control means (for example an automatic gate P in FIG. 1) controlled based on the result of the authentication/identification: if an authorized user is recognized, access is authorized. Said biometric acquisition means 14 can be directly mounted on said access control means.

Enrollment

The reference personal data base may have been established in advance. For example, the passengers may have presented their identity document upstream, so as to generate a database stored in storage module 12.

The present invention proposes to use a functional encryption for a polynomial function of degree 1 or 2 parameterized with a reference personal data. It is thus understood that there are as many different functions as there are reference personal data. Preferably, said polynomial function parameterized with a reference personal data is a function "of distance from the reference personal data", thus making it possible to compare the input of the function with the reference personal data, and preferentially the function "scalar product with the reference personal data", even if other distance functions could be used, for example the Euclidean distance which is of degree 2.

Thus, if input data is taken as data to be compared with the reference personal data, the result of the functional decryption of this encrypted data is directly the result (unencrypted) of the application to this input data of the polynomial function of degree 1 or 2 parameterized with the reference personal data, i.e. the distance of this data from said reference personal data. It is thus sufficient to have several private decryption keys each associated with a reference personal data $(s_k1, s_k2 \ldots)$ in order to be able to calculate the polynomial function for each reference personal data, i.e. distances with all these reference personal data as so many different functions.

Noting:

ref$_i$ is the i-th reference personal data, can is candidate personal data, $f_i=f_{refi}$ is said polynomial function of degree 1 or 2 parameterized with ref$_i$, $s_ki=s_k(f_i)$ is the functional decryption key for the function $f_i$, then if the polynomial function is a distance function we have:

$$\mathrm{Dec}(s_ki,\mathrm{Enc}(p_k,\mathrm{can}))=f_i(\mathrm{can})=d(\mathrm{can},\mathrm{ref}_i).$$

Preferably, the private decryption key(s) associated with each reference personal data are generated on the fly from said reference personal data, so that the reference personal data is not stored (which avoids any risk of disclosure, and is also very economical in terms of storage size), and a private decryption key base is directly established rather than said reference personal database. For example, each private decryption key is directly generated when the corresponding identity document is read.

Figure 2:
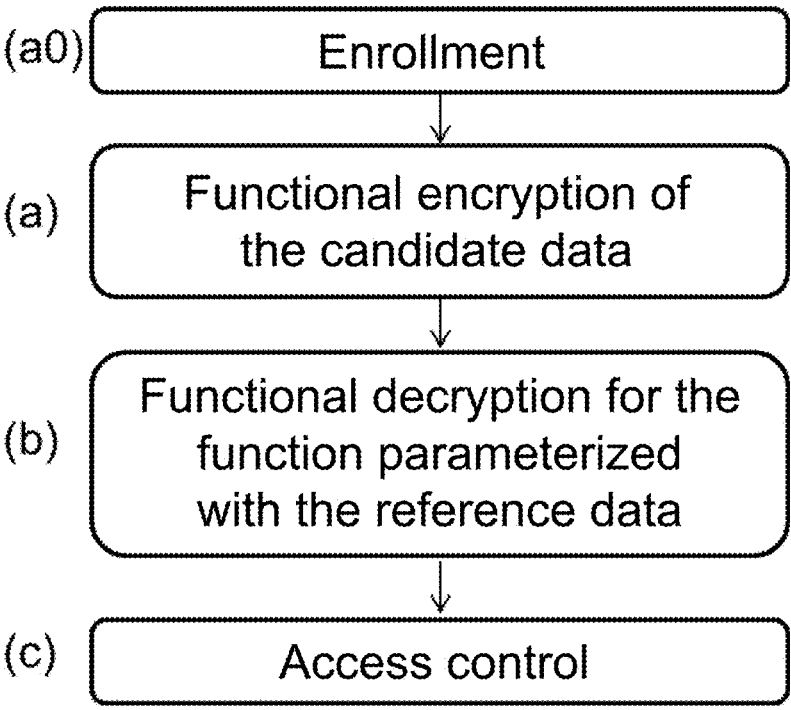
FIG. 2 illustrates the steps of an embodiment of a method according to the invention.

As such, with reference to FIG. 2, the method preferentially begins with a step (a0), called enrollment, for generating said functional decryption private key for the polynomial function of degree 1 or 2 parameterized with said reference personal data, from a master key and said reference personal data.

In fact, functional encryption provides for this possibility of using a secret master key, and in the case of a distance function said functional private decryption key for the distance function with said reference personal data is typically generated as the distance (obtained by applying said distance function) between said master key and said reference personal data, e.g. by at least one scalar product between said master key and said reference personal data if said function is the scalar product.

Step (a0) can also comprise the generation of said functional encryption public key from the same master key, which makes it possible to have associated public and private keys.

It is possible to have a unique master key stored in a very secure manner, for example only in the hardware security module 10, but alternatively we have a master key per "session", that is per group of identifications/authentications. For example, in the case of passenger screening before boarding, we have a master key per flight, which can be drawn from a list, randomly generated, etc.

Thus, in a particularly preferred way step (a0) comprises the generation of said master key; obtaining at least one reference personal data; and, for each reference personal data obtained, the generation of the functional decryption private key for the polynomial function of degree 1 or 2 parameterized with said reference personal data, so as to establish a base of functional decryption private keys. The public key is also generated at the same time.

To limit the use of the public key and/or private keys, it(they) is(are) advantageously entrusted to an authority (e.g. governmental), and/or stored in step (a0) in one (or more) hardware security module(s) 10 (which can therefore be a hardware security module 10 controlled by said authority), although it is possible, as explained simply, to use storage module 12 in particular for private keys. Preferentially, and as will be seen, on the one hand the public key is entrusted to an authority and on the other hand the private keys are stored in the hardware security module 10 (by instantiating a binary with the private keys), that the authority controls via the public key.

Method for Processing Personal Data

The method itself begins with a step (a) of functional encryption of candidate personal data using said functional encryption public key.

It is important to understand that if the enrollment can be carried out well before the authentication/identification itself, in the biometric case the candidate data must be obtained at worst a few minutes before, to guarantee the "newness" of this candidate data.

The public functional encryption key is preferentially entrusted to an authority so that this latter can control the implementation of step (a). This is quite paradoxical because this key remains a public key (and not a private key) that alone does not make it possible to decrypt anything, but as will be explained later, the present method is distinguished in that it has a unique public key and many private keys, rather than the other way around, hence the fact that it may be advantageous to protect this public key in particular to prevent any intentional use by a third party who would try to obtain information about said polynomial function. Thus, this control by an authority can be exercised by means of the hardware security module 10, i.e. it is the authority that makes the public key available to module 10 in order to implement step (a) in a way, or else it is a security module 10 of the authority that directly stores the functional decryption public key for the implementation of step (a).

It remains of course entirely possible in addition or alternatively to entrust the functional decryption private keys to this authority.

The objective of entrusting the public key (rather than the private keys) is also that the authority can verify before its use that the person submitting the new candidate data is indeed a physical person.

As explained, the system 1 further comprises biometric acquisition means 14 for obtaining said candidate biometric data. Generally, the candidate biometric data item is generated by the data processing module 11 from a biometric trait supplied by the biometric acquisition means 14, but the biometric acquisition means 14 can comprise their own processing means and for example take the form of an automatic device provided by the control authorities (in the airport) to extract the candidate biometric data. Such a device can, if necessary, encrypt the candidate biometric data on the fly, advantageously directly with the functional encryption public key. Thus, the candidate biometric data is also completely protected.

Preferably, the biometric acquisition means 14 are capable of detecting living beings, so as to ensure that the candidate biometric data item comes from a "real" trait.

In the case where the means 14 and the rest of the system are remote, the communication between the two can itself be encrypted.

The present method differs, as explained in a very original manner, in that there is no comparison actually carried out between the candidate personal data and the reference personal data. However, a result is obtained from this comparison, and this without the personal data having been accessible once.

In fact, in the following step (b), the encrypted candidate biometric data is simply functionally decrypted using the functional decryption private key for the polynomial function of degree 1 or 2 parameterized with said reference personal data: by virtue of the properties of the functional encryption, the result is not the candidate biometric data in unencrypted form, but directly the result of the application to the candidate biometric data of the polynomial function of degree 1 or 2 parameterized with the reference personal data, for example their scalar product, which is indeed the result of their comparison.

It is noted that basing the private decryption key on the reference data and not the candidate data (i.e. It is indeed a functional decryption key for the polynomial function of degree 1 or 2 parameterized with the reference personal data, and not with the candidate personal data) is counter-intuitive, because it requires having as many private decryption keys as reference data whereas usually the public key is used to encrypt the reference data, which requires calculating the functional private key associated with each candidate data to carry out the associated comparison, but this solution turns out to be very reliable and makes it possible to eliminate the risks and high storage size inherent in storing a reference personal data base.

This step (b) is implemented for at least one reference personal data, advantageously for each reference personal data, i.e. if there is a base of functional decryption private keys, the cipher of the candidate personal data is decrypted independently as many times as there are private keys in the database, the result of said decryption is thus the result of the application to the candidate biometric data of each polynomial function of degree 1 or 2 parameterized with a reference personal data, i.e. the scalar product with each reference personal data in the preferred embodiment.

This step (b) is typically implemented by the hardware security module 10 if it stores the private keys.

Step (b) may further comprise the processing of the result of the polynomial function (i.e. the result of the decryption of the encrypted candidate personal data) in order to obtain another data, in particular a data representative of the result of said comparison. Typically, this data representative of the result of said comparison is a result of identification/authentication of the individual, i.e. typically a Boolean of belonging to the base.

Indeed, the individual is authenticated if the decryption reveals a similarity rate between the candidate data and the "target" reference data exceeding a certain threshold, the definition of which may depend on the calculated distance. In such an embodiment, the system 1 (and more specifically the hardware security module 10 if it carries out this processing, as it can indeed be module 11) can return the Boolean depending on whether the threshold is exceeded, or else the similarity rate directly (or else another score calculated from said similarity rate, for example a discrete "level" of similarity to limit the quantity of information, or even a normalized version, if slightly noisy).

In the case of an identification, the system 1 can return for example the different similarity rates/scores associated with each reference data, or the identifiers of the reference data or data for which the similarity rate exceeds said threshold.

For other types of personal data, for example alphanumeric data, the reference data and the candidate data must be identical, so that a Boolean can be returned directly indicating whether this is the case.

Typically, any data representative of the result of the comparison can be used as output data. It should be noted that said data representative of the result of the comparison can directly be this result of the comparison (for example the value of the distance).

In the preferred embodiment wherein a hardware security module 10 stores the public key and/or the private keys and respectively implements step (a) and/or step (b), those skilled in the art will be able to draw inspiration from the IRON architecture using the SGX system to make it possible to easily and securely carry out all the previously mentioned calculations (i.e. distances, normalizations, thresholdings, etc.), see the document Ben Fisch, Dhinakaran Vinayagamurthy, Dan Boneh, Sergey Gorbunov: *IRON: Functional Encryption using Intel SGX*, which describes how the attestation of a function (instantiated by its binary) is signed to ensure that its execution is limited to that particular function. In IRON, the operand data of the function are encrypted under a conventional public key whose private decryption key becomes available on presentation of the signature validating this local attestation.

Here the originality is that it is preferentially the reverse: it is the public encryption key that the authority can make available or use when conditions are met, for example when the other checks related to identification are passed (control of an identity document, of the living being during the acquisition of the candidate personal data, etc.), to control the implementation of step (a).

Indeed, the public key makes it possible to control the encryption of the candidate personal data and therefore the use of each private decryption key. More precisely, if the public key is entrusted to an authority, its implementation for encryption is carried out under its control in a first module 10. In parallel, it is possible to instantiate the binary with the private encryption keys in a second module 10, and to require from the authority not the private decryption keys but the public encryption key. If the aforementioned conditions are verified, the authority makes available the public key of the first module 10 and the latter can encrypt the candidate personal data (step (a)) and send it to the second module 10 to execute the binary (step (b)), so as to obtain each result, for example each distance, and where appropriate said other data representative of the result of said comparison (its calculation after the decryption(s) can be defined in the binary) in a completely secure manner.

SGX allows in effect:

the creation of a secure enclave isolated in terms of confidentiality and integrity from other processes running on the same data processing module; in particular the underlying OS, the attestation that calculations have been carried out in the given secure enclave, the possibility of preserving the code and the data of the secure enclave.

Finally, the method advantageously further comprises a step (c) for implementing an access control based on the result of the functional decryption of the candidate encrypted biometric data, i.e. of said data representative of the result of said comparison. In other words, if the individual to whom the candidate personal data belongs has been correctly identified/authenticated, he or she is "authorized" and other actions such as the opening of the automatic gate P may occur.

Computer Program Product

According to a third and a fourth aspect, the invention relates to a computer program product comprising code instructions for the execution (in particular on the data processing module 11 and/or the hardware security module 10 of the system 1) of a method according to the first aspect of the invention, as well as storage means readable by computer equipment (a data storage module 12 of the system 1 and/or a memory space of the hardware security module 10) on which this computer program product is found.

What is claimed is:

1. A method for processing personal data, comprising:

functional encryption of candidate personal data using a functional encryption public key;

generating a functional decryption private key from a master key and from reference personal data, and functional decryption of the encrypted candidate personal data using the functional decryption private key for a polynomial function of degree 1 or 2 parameterized with the reference personal data already stored, wherein the functional decryption of the encrypted candidate personal data cannot be used to trace back to said reference personal data, and wherein the functional decryption of the encrypted candidate personal data is a distance between the candidate personal data from the reference personal data.

2. The method according to claim 1, wherein the polynomial function of degree 1 or 2 parameterized with the reference personal data is a distance function with reference personal data.

3. The method according to claim 1, wherein the functional decryption private key for the distance function with the reference personal data is generated by applying a distance function between the master key and the reference personal data.

4. The method according to claim 1, wherein said generating the functional decryption private key comprises generating the functional encryption public key from the master key.

5. The method according to claim 1, wherein said generating the functional decryption private key comprises generating the master key; by obtaining a reference personal data; and, by generating the functional decryption private key for the polynomial function of degree 1 or 2 parameterized with the reference personal data obtained, so as to constitute a base of functional decryption private keys.

6. The method according to claim 1, wherein said the candidate personal data is a candidate biometric data, and wherein the functional encryption comprises obtaining the candidate biometric data from a biometric trait using biometric sensor.

7. The method according to claim 1, wherein the functional encryption public key is entrusted to an authority controlling the functional encryption.

8. The method according to claim 1, wherein the system comprises a hardware security module of a system stores the functional decryption private key for the polynomial function of degree 1 or 2 parameterized with the reference personal data and implements the functional decryption.

9. The method according to claim 1, wherein the system comprises a hardware security module, the functional decryption further comprising processing by the hardware security module of the result of the polynomial function so as to obtain another data representative of the result of a comparison between the candidate personal data and the reference personal data.

10. The method according to claim 5, wherein said generating the functional decryption private key comprises storing the base of functional decryption private keys in a hardware security module, by instantiating a binary with the functional decryption private keys.

11. The method according to claim 7, wherein the functional encryption is implemented by providing the functional encryption public key to a hardware security module of a system.

12. A biometric data processing system, comprising one or more computers, configured for:

functional encryption of candidate personal data using a functional encryption public key;

generating a functional decryption private key from a master key and from reference personal data; and functional decryption of the encrypted candidate biometric data using the functional decryption private key for a polynomial function of degree 1 or 2 parameterized with the reference personal data already stored, wherein the functional decryption of the encrypted candidate personal data cannot be used to trace back to said reference personal data, and wherein the functional decryption of the encrypted candidate personal data is a distance between the candidate personal data from the reference personal data.

13. A non-transitory computer program product comprising code instructions for the execution of a method for processing personal data, when the method is executed on a computer, the method comprising:

functional encryption of candidate personal data using a functional encryption public key;

generating a functional decryption private key from a master key and from reference personal data; and functional decryption of the encrypted candidate personal data using the functional decryption private key for a polynomial function of degree 1 or 2 parameterized with a reference personal data already stored, wherein the functional decryption of the encrypted candidate personal data cannot be used to trace back to said reference personal data, and wherein the functional decryption of the encrypted candidate personal data is a distance between the candidate personal data from the reference personal data.

14. A non transitory storage means readable by computer equipment on which a computer program product comprises code instructions for the execution of a method for processing personal data comprising:

functional encryption of candidate personal data using a functional encryption public key;

generating a functional decryption private key from a master key and from reference personal data; and functional decryption of the encrypted candidate personal data using the functional decryption private key for a polynomial function of degree 1 or 2 parameterized with a reference personal data already stored, wherein the functional decryption of the encrypted candidate personal data cannot be used to trace back to said reference personal data, and the functional decryption of the encrypted candidate personal data is a distance between the candidate personal data from the reference personal data.

\* \* \* \* \*